US010932318B2

(12) United States Patent
Ortiz

(10) Patent No.: US 10,932,318 B2
(45) Date of Patent: *Feb. 23, 2021

(54) SELF-CONTAINED, SYNCHRONIZED DATA COMMUNICATION SYSTEM NODES AS STAND-ALONE PODS OR EMBEDDED IN CONCRETE WALKWAYS AND IN WALLS AT PUBLIC VENUES INCLUDING SPORTS AND ENTERTAINMENT VENUES

(71) Applicant: Mesa Digital, LLC, Albuquerque, NM (US)

(72) Inventor: Luis M. Ortiz, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,672

(22) Filed: Apr. 7, 2020

(65) Prior Publication Data

US 2020/0236736 A1 Jul. 23, 2020

Related U.S. Application Data

(63) Continuation of application No. 15/657,458, filed on Jul. 24, 2017, now Pat. No. 10,652,952, which is a continuation of application No. 12/871,182, filed on Aug. 30, 2010, now Pat. No. 9,743,460.

(60) Provisional application No. 61/261,655, filed on Nov. 16, 2009.

(51) Int. Cl.
*H04W 84/10* (2009.01)
*H04W 56/00* (2009.01)
*H04W 84/20* (2009.01)
*H04W 88/08* (2009.01)

(52) U.S. Cl.
CPC .......... *H04W 84/10* (2013.01); *H04W 56/00* (2013.01); *H04W 84/20* (2013.01); *H04W 88/08* (2013.01)

(58) Field of Classification Search
CPC ..................................................... H04W 84/10
See application file for complete search history.

(56) References Cited

U.S. PATENT DOCUMENTS

| | | | | |
|---|---|---|---|---|
| 5,299,177 A * | 3/1994 | Koch | ........................ | G04C 3/14 368/73 |
| 5,642,378 A * | 6/1997 | Denheyer | ............. | H03F 1/0244 375/216 |
| 5,999,124 A * | 12/1999 | Sheynblat | ................ | G01S 19/46 342/357.29 |
| 6,529,519 B1 * | 3/2003 | Steiner | ................... | G06F 12/023 370/395.7 |

(Continued)

*Primary Examiner* — Ankur Jain
(74) *Attorney, Agent, or Firm* — Ortiz & Lopez, PLLC; Kermit D. Lopez; Luis M. Ortiz

(57) ABSTRACT

A system supports communications of video and data to hand held devices located within a public venue (e.g., sports stadium). A pod includes at least one of a synchronized server and wireless communications electronics. The pod includes an antennae integrated therein. The pod can be deployed as a communications node within the public venue and provides data including video through a data network from at least one server to hand held wireless devices located in the public venue. The pod can include a rechargeable power source sustaining self-contained operation of the wireless communication electronics. An optional solar cell can provide electrical power to charge the rechargeable power source. A pod can be embedded in the wall or floor surface of said public venue and can be provided in the form of a core hole plug.

21 Claims, 6 Drawing Sheets

(56) References Cited

U.S. PATENT DOCUMENTS

| | | | | |
|---|---|---|---|---|
| 6,662,490 | B1* | 12/2003 | Aesch, Jr. | A01M 1/24 |
| | | | | 43/124 |
| 7,149,549 | B1* | 12/2006 | Ortiz | H04N 5/23293 |
| 7,610,055 | B2* | 10/2009 | Erhart | H04M 1/7253 |
| | | | | 455/463 |
| 7,797,023 | B2* | 9/2010 | Tischer | H04W 84/18 |
| | | | | 455/574 |
| 2003/0058707 | A1* | 3/2003 | Dilger | H04H 60/06 |
| | | | | 365/200 |
| 2004/0032495 | A1* | 2/2004 | Ortiz | H04N 21/4314 |
| | | | | 348/157 |
| 2005/0117752 | A1* | 6/2005 | Ilma | H04L 63/08 |
| | | | | 380/270 |
| 2009/0017749 | A1* | 1/2009 | Braun | H04W 4/021 |
| | | | | 455/3.01 |
| 2009/0063274 | A1* | 3/2009 | Dublin, III | G06Q 30/0257 |
| | | | | 705/14.1 |
| 2009/0175429 | A1* | 7/2009 | Cohen | H04Q 11/0435 |
| | | | | 379/201.02 |
| 2009/0323802 | A1* | 12/2009 | Walters | H04N 5/23206 |
| | | | | 375/240.01 |
| 2011/0087796 | A1* | 4/2011 | Littlejohn | H04H 20/103 |
| | | | | 709/231 |
| 2011/0295700 | A1* | 12/2011 | Gilbane | G06Q 30/00 |
| | | | | 705/14.71 |

* cited by examiner

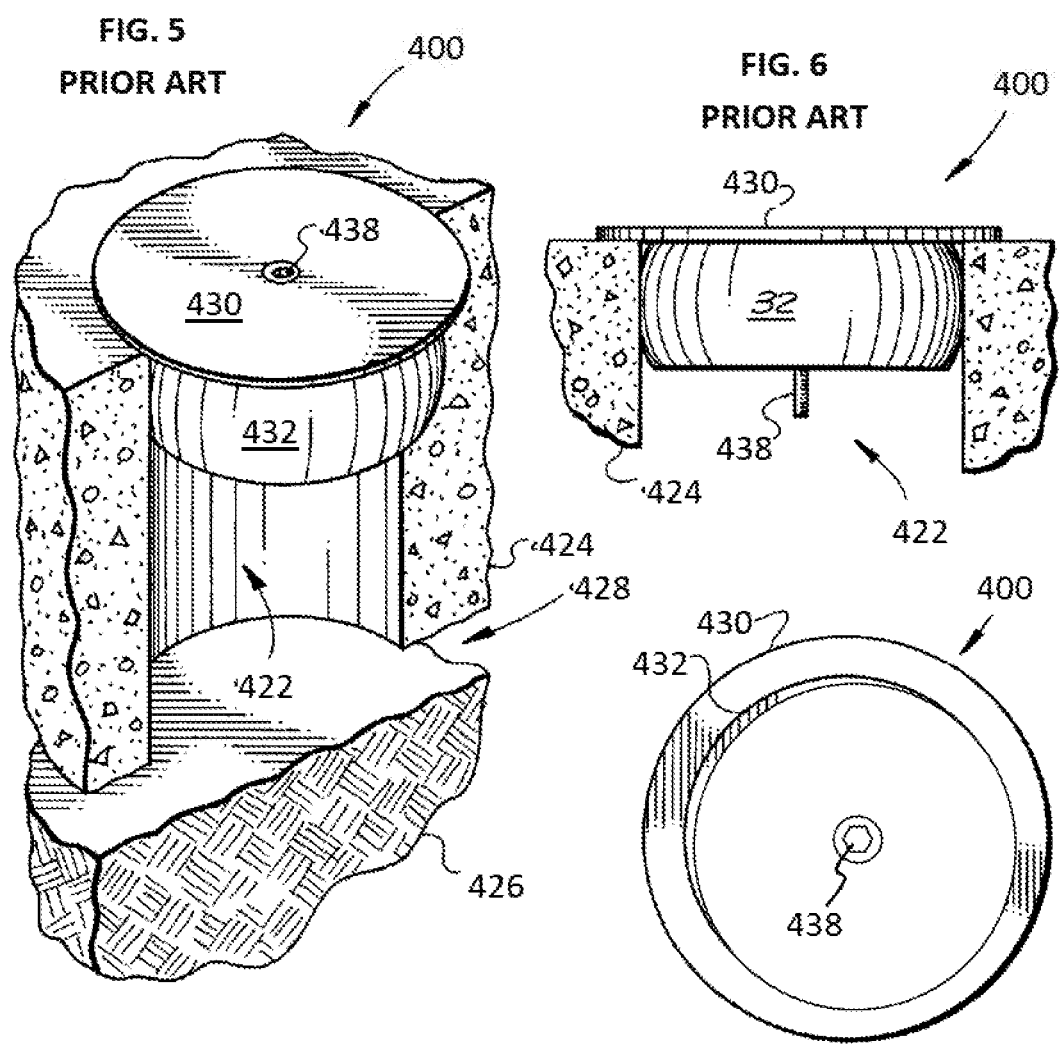

SELF-CONTAINED, SYNCHRONIZED DATA COMMUNICATION SYSTEM NODES AS STAND-ALONE PODS OR EMBEDDED IN CONCRETE WALKWAYS AND IN WALLS AT PUBLIC VENUES INCLUDING SPORTS AND ENTERTAINMENT VENUES

CROSS-REFERENCE TO PATENT APPLICATION

This patent application is a continuation of U.S. patent application Ser. No. 15/657,458, entitled "Self-Contained, Synchronized Data Communication System Nodes as Stand-Alone Pods or Embedded in Concrete Walkways and in Walls at Public Venues Including Sports and Entertainment Venues," which was filed on Jul. 24, 2017, and which is incorporated herein by reference in its entirety.

U.S. patent application Ser. No. 15/657,458, is a continuation of U.S. patent application Ser. No. 12/871,182 entitled "Self-Contained, Synchronized Data Communication System Nodes as Stand-Alone Pods or Embedded in Concrete Walkways and in Walls at Public Venues Including Sports and Entertainment Venues," which was filed on Aug. 30, 2010, the disclosure of which is incorporated herein by reference in its entirety. U.S. patent application Ser. No. 12/871,182 issued as U.S. Pat. No. 9,743,460 on Aug. 22, 2017 and is incorporated herein be reference in its entirety.

U.S. patent application Ser. No. 12/871,182 claims priority under 35 U.S.C. 119(e) to and the benefit of U.S. Provisional Patent Application Ser. No. 61/261,655, entitled "Self-Contained, Synchronized Data Communication System Nodes as Stand-Alone Pods or Embedded in Concrete Walkways and in Walls at Public Venues Including Sports and Entertainment Venues," which was filed on Nov. 16, 2009, the disclosure of which is also incorporated herein by reference in its entirety. This patent application therefore claims priority to the Nov. 16, 2009 filing date of U.S. Provisional Patent Application Ser. No. 61/261,655.

TECHNICAL FIELD

Embodiments are generally related to a wireless communications networks. More particularly, embodiments are related to wireless data communications system communications nodes set up to establish a communication network within public venues including sports and entertainment venues. Embodiments are also related to wireless data communications systems including communications nodes including synchronized data servers deployed throughout a public venue and supporting access to video and data by hand held devices also located within the public venue.

BACKGROUND

Wireless data communications technology has now found its place in sports and entertainment venues over the past decade. Video and data related to an event at sports venues is now widely available on portable hand held devices such as mobile phones and proprietary devices that can be rented at the sports venues. Wireless communication can be provided to handheld devices via cellular and 802.11 (Wi-Fi) systems. In addition to live video from different perspectives, such as that provided to spectators at sporting events by Kangaroo Media, Inc., of Montreal, Canada (www.kangaroo.tv), social networking, gaming and vending applications are also being provided to spectators. Such systems and applications are well documented in U.S. Pat. Nos. 7,149, 549, 7,376,388 and 7,620,426, which are herein incorporated by reference for their teaching.

New sports and entertainment venues are now being designed and built to incorporate wireless data communications infrastructure in order to enable enhanced spectator experiences. Examples of such venues include Yankee Stadium, in New York, and Dallas Cowboy Stadium, in Irving, Tex., which have both been enabled with substantial investments in Cisco wireless network technology to enable video and data access for venue attendees using personal hand held devices.

Although new stadiums are being built with wireless capabilities, still many entertainment venues are older and lack the "built-in" wireless data communications infrastructure necessary to support large scale hand held device access to live video recorded by cameras at entertainment venues and associated entertainment data. Furthermore, some entertainment venues may only require temporary installations of wireless video and data communications capabilities for a special event. Also, bandwidth limitations have been experienced where video content is being accessed from a data server over a data network simultaneously by several hand held devices as client within a venue. Several hundred to several thousand clients (e.g., smart phones with Wi-Fi and video capabilities) can be attempting simultaneous access to data from a server, or servers that are located in the same centralized location (e.g., production room) over a public venue's wireless data network. This very large amount of simultaneous data requests locally can result in choppy distribution, server failure or other data distribution issues. For the foregoing reasons, there is a need to provide systems that can enable video and data communications simultaneously with multiple wireless hand held devices for newer and older entertainment venues, and/or for any public venues where data access is only needed temporarily or long-term. The present invention provides a solution for this need.

SUMMARY

Accordingly, it is a feature of the disclosed embodiments to provide self-contained communications system nodes establishing a wireless data communication network within public venues, such as sports and entertainment venues, for providing video and data to hand held devices located at said venues.

It is also a feature of the disclosed embodiments to provide self-contained communications system nodes as stand-alone pods at public venues such as sports and entertainment venues.

It is also feature of the disclosed embodiments to provide self-contained communications system nodes for embedded use in concrete walkways and in walls at public venues such as sports and entertainment venues.

Accordingly, it is a feature of the disclosed embodiments to provide a system supporting the communications of video and data to hand held devices located within a public venue including at least one pod containing a data server ("remote, synchronized server") that is continuously synchronized with a primary server ("central, synchronizing server") that can be located at a content management center.

It is a feature of the disclosed embodiments to provide a system supporting the communications of video and data to hand held devices located within a public venue including wireless data communications electronics (e.g., wireless access point, repeaters) and an integrated antennae that can be deployed as a communications node within the public venue and can provide data including video from at least one server to hand held wireless devices located in the public venue through a data network.

It is another feature of the disclosed embodiments that the system supporting the communications of video and data to hand held devices located within a public venue include more than one pod deployed throughout the public venue.

It is yet another of the disclosed embodiments that communications pods can each further includes a rechargeable power source sustaining self-contained operation of the wireless communication electronics.

It is another feature of the disclosed embodiments that each communications pod can further include a solar cell providing an electrical power to charge the rechargeable power source contained in the pod.

It is another feature of the disclosed embodiments that communications pods can be embedded in a wall or floor surface of said public venue.

It is yet another feature of the disclosed embodiments that communications pods can further comprise of a core hole plug that includes the wireless communications electronics therein and that such pods can be embedded in a wall or floor surface of said pubic venue.

BRIEF DESCRIPTION OF DRAWINGS

FIG. 5, labeled as prior art, illustrates a side view of the core hole plug assembly of FIG. 4 sealing a hole passing through a paving layer.

FIG. 6, labeled as prior art, illustrates a vertical cross section of the core hole plug of FIGS. 4 and 5.

FIG. 7, labeled as prior art, illustrates a bottom view of the core hole plug assembly of FIGS. 4 to 6.

DETAILED DESCRIPTION

Figure 1:
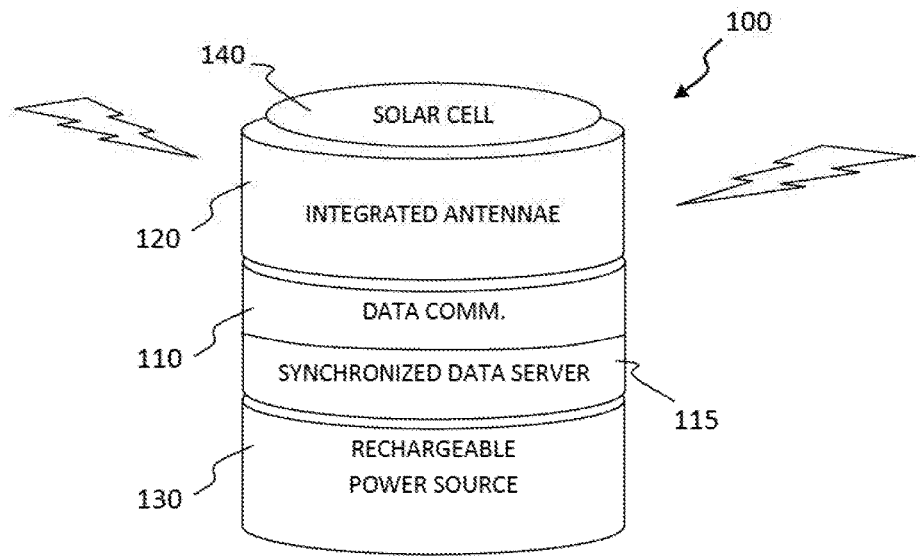
FIG. 1 illustrates a block diagram of components that can be included in wireless data communications system nodes establishing a communication network within sports and entertainment venues, in accordance with an example embodiment.

Access points, which are often interconnected by cabling, generally play a dominant role in providing radio frequency (RF) coverage in most wireless LAN (WLAN) deployments. Wireless repeaters, though, are an alternative way to extend the range of an existing WLAN instead of adding more access points. There are very few stand-alone 802.11 wireless repeaters on the market, but some access points have a built-in repeater mode. The wireless communications electronics representing access points and wireless repeaters will be referred to herein as communications system nodes, or simply as communications nodes.

In general, a repeater simply regenerates a network signal in order to extend the range of the existing network infrastructure. A WLAN repeater does not physically connect by wire to any part of the network. Instead, it receives radio signals (802.11 frames) from an access point, end user device, or another repeater and retransmits the frames. This makes it possible for a repeater located in between an access point and distant user to act as a relay for frames traveling back and forth between the user and the access point.

As a result, wireless repeaters are an effective solution to overcome signal impairments such as RF attenuation. For example, repeaters provide connectivity to remote areas that normally would not have wireless network access. In sports and entertainment venue deployments, temporary placement and large areas requiring coverage can result in access points that don't quite cover areas where spectators using hand held devices desire connectivity. The placement of a repeater between the covered and uncovered areas, however, can provide connectivity throughout most of the venue space. The wireless repeater fills holes in coverage, enabling seamless roaming. Although the most modern venues includes built-in wireless infrastructure, older venues often require retrofitting to incorporate wireless communications equipment, or the equipment will only be temporary and must be installed just before an event. Temporary use will be typical with multi-purpose venues. The present invention provides a system that can simplify the temporary or retrofit placement of wireless data communications equipment as pods throughout sports and entertainment venues.

Server synchronization can be explained as a master-client relationship wherein a primary server can replicate itself (e.g., its data) at a slave server. Simultaneous synchronization enables the master to replicate itself at several slave severs (or clients). The benefit of utilizing server data synchronization within a public venue, in particular a sports stadium wherein captured video data from multiple perspectives is stored in a main server, is to take the burden off of a data server when multiple clients are requesting to receive stored data from the server. During a live entertainment event, video captured by several cameras at a sports venue can be processed and stored simultaneously by a primary server (typically located in a production/control room at the venue). Data, including video, from the primary server can be distributed to several handheld devices located within the venue over the venue's wireless data network. More than 1000 hand held devices can be simultaneously requesting to receive (and view) the same data. In order to relieve a primary server from the burden of serving the 1000+ hand held clients, a better solution proposed by the present inventor is to provide several synchronized servers throughout a sports venue so that the burden can be shared. For example, if five synchronized servers are available and evenly spread out throughout a sports venue, then each server may only need to service 200 clients. The primary server, meanwhile, will only be responsible for five client, which are the synchronized servers.

Communications electronics can be provided within sports and entertainment venues in the form of self-contained pods. As illustrated in FIG. 1, a pod 100 can include wireless communications electronics 110, a synchronized data server 115, an integrated antenna 120, rechargeable power source 130 and an optional solar power cell 140, in accordance with an example embodiment. The pod 100 can be provided in the form of a movable, weatherproof container that can be placed in strategic locations throughout a venue and remain protected from weather and vandalism. FIG. 1 depicts a pod in the form of a barrel, although the shape of a pod 100 should not be restricted. The size of the pod 100 is dependent on components used to provide battery-operated wireless data communications. WiFi transceivers and repeaters comprising the wireless communications electronics 110, for example, typically do not require much space; however, the size of rechargeable batteries 130 required to power the wireless communications electronics 110 will depend on the length of use and continuous power required for the wireless communications electronics 110. In daytime deployments where pods might be exposed to sunlight, an optional solar cell 140 can be located at the top surface of the pod container where the solar cell 140 can obtain maximum sunlight and can provide a trickle charge to rechargeable batteries 130 located within the pod 100. Outdoor stadiums, such as racing venues, football stadiums, or cricket stadiums, as well as large amusement parks and outdoor public gathering places, would benefit from a solar powered communications pod 100. Solar power can extend operation time for the pod 100. Solar cells can vary in size, depending on the surface area of the pod's top surface. Weather resistance is also an important consideration for the communications pods 100. A housing that allows ventilation and minimizes water saturation an interference with electronics and power sources contained therein would ideally be utilized for pods 100. Housing used for outdoor speaker systems are known to allow sound to emanate from the housing, yet also minimize moisture penetration within the speaker housing. U.S. Pat. No. 4,574,906 issued to White et al is representative of such a housing.

Figure 2:
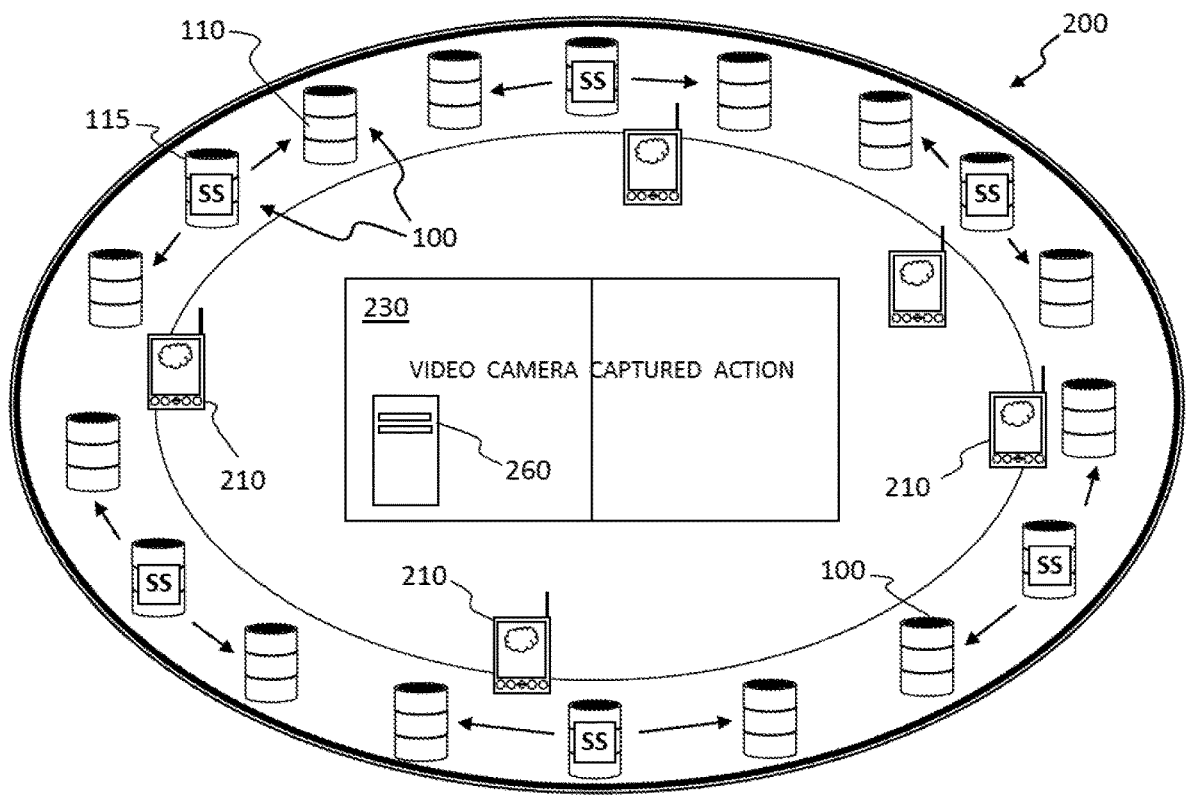
FIG. 2 illustrates a top perspective view of a sports and entertainment venue including wireless data communications system nodes distributed throughout the sports and entertainment venue for establishing a wireless communication network in communication with hand held devices used by spectator within sports and entertainment venues, in accordance with an example embodiment.

As illustrated in the top perspective view of FIG. 2, a sports and entertainment venue 200 can include wireless data communications system nodes 100 distributed around and throughout the sports and entertainment venue 100 for establishing a wireless communication network in communication with hand held devices 210 used by spectators within sports and entertainment venue 100, in accordance with an example embodiment. The wireless communications network supported by the pods 100 enable handheld devices 210 to receive multiple perspective of an event 230 in video captured within the venue by cameras as shown in block 230, and as thoroughly taught in U.S. Pat. Nos. 7,149,549, 7,376,388 and 7,620,426. As shown in FIG. 2, however, synchronized servers 115 (labeled "SS") can be distributed evenly around a public venue in order better facilitate hand held client access to video and data from a primary server 260 that is being simultaneously replicated by the synchronized servers 115. Each synchronized server 115 shown in FIG. 2 is coordinating wireless data traffic to hand held devices 210 with the assistance of two other pods 110. It can now be appreciated how much more efficient video can be distributed within sports and entertainment venues using a synchronized server scheme.

Figure 3:
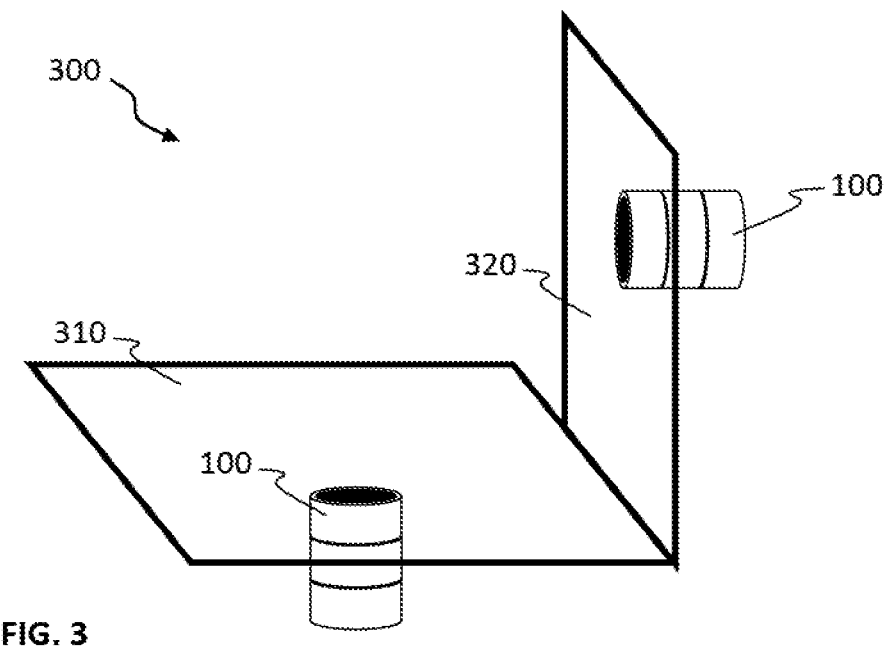
FIG. 3 illustrates a perspective view of a floor and wall including a core hole plug assembly incorporating wireless communications electronics therein and embedded in the floor and wall of a sports and entertainment venue, in accordance with an example embodiment.

In some venues, it may be desirable to more permanently install communications pods 100 for ongoing use. Such can be the case wherein an older sports venue requires wireless communications infrastructure and the older venue must be retrofitted to incorporate the wireless communications infrastructure with little aesthetic and space encumbrances on the venue. As shown in FIG. 3, self-contained communications pods 100 can be embedded into the flooring 310 and walls 320 of a sports and entertainment venue 300. Embedded pods can be accomplished by providing the communications electronics 110 in a carrier that can mount flush with the flooring 310 or wall 320 surfaces.

A core hole plug assembly has been described in U.S. Pat. No. 6,662,490, issued to Aesch, Jr., can provide a carrier for the communications electronics 110. As such, a core hole plug can serve as an embedded pod 100. The pod 100 in the form of a core hole plug assembly can also include a rechargeable power source 130 and embedded antennae 120. Alternatively, power can be provided to the embedded pod via wiring accessible within the flooring 310 or walls 320. A solar cell 140 can also be optionally provided at the surface of the pod to provide a trickle charge to rechargeable power source 130, if provided in the pod.

The '490 patent describes a core hole plug for covering and sealing a hole in a paved surface, wall or other structure. As described in the '490 patent, many locations such as urban environments, office parks, shopping centers, offices, and industrial and commercial buildings are surrounded in whole or in part with paved surfaces such as but not limited to concrete paving, asphalt paving, stone or brick paving, and paving made of similar materials. The paving takes many forms, e.g. driveways, sidewalks, etc. A typical paving is a concrete slab or other paving material about four to eight inches thick. Offices, warehouses, and other industrial and commercial buildings often have solid or hollow walls made of concrete, block or other materials of various thicknesses e.g. walls having thicknesses of six to eight inches or more.

Although core holes or other holes are typically about three inches or slightly greater in diameter, the diameter and depth of a communications pod 100 can vary depending on the required size of the internal compartment to accommodate the modules (e.g., battery, electronics) to support wireless communications.

Core holes are sometimes formed in paved surfaces and walls for various purposes, such as but not limited to, tests to determine if the paving or wall meets specifications, the treatment of cockroaches, ants, and various other pests, the passage of utilities through the walls, etc. Once a core has been taken from or a hole otherwise made in a paved surface, wall or other structure there usually is a need to cover and seal the hole, e.g. after a core sample has been taken, after pests have been treated, prior to the installation or after the removal of utilities, etc. Since core hole plugs are relatively easy to install and unobtrusive or inconspicuous, rather than patching these holes, these holes are frequently covered and sealed with core hole plugs. In addition to being easy and quick to install and unobtrusive or inconspicuous, the core hole plugs have another advantage over patching the holes. Should there be a need to later gain access to the interior of the hole, the core hole plug can be removed.

FIGS. 4-7, labeled as prior art, illustrates a typical core hole plug assembly 400. The illustrated core hole plug assembly 400 can be used for many different applications to cover and seal a hole in a paving layer, hollow or solid wall, or other structure. For the purposes of illustration, the core hole plug assembly 400 is shown in FIGS. 4-7 covering and sealing a hole 422 passing through a paving layer 424. The paving layer 424 may be any of numerous paving layers found adjacent and/or under building structures, such as but not limited to concrete paving or slabs, asphalt paving, stone or brick paving, and paving made of similar materials. As previously discussed, the paving layers are typically about four to eight inches in thickness and the core holes 422 passing through these paving layers are typically about 3 inches in diameter. Since the soil 426 beneath a paving layer 424 may fall away from the bottom of the paving layer, a hole 422 passing through a paving layer is frequently several inches greater in depth than the thickness of the paving layer and may include a cavity 428 beneath a paving layer into which components of a core hole plug assembly may fall.

A core hole plug assembly 400 typically includes a cover plate 430; a deformable, resilient expansible plug 432; a compression plate 434; and a bolt and nut assembly 436 with a bolt 438 and a nut 440. The expansible plug 432 is cylindrical with a tubular sidewall 442. Preferably, the compression plate 434 is a circular disk and the nut 440 of the bolt and nut assembly 436 is welded or otherwise nonrotatably affixed to and integral with the compression plate 434. The compression plate 434 is permanently and non-rotatably secured to the lower end portion 444 of the expansible plug 432, preferably, by being molded into or otherwise completely embedded within the lower end portion 444 of the expansible plug 432 so that the compression plate 434 does not rotate relative to the expansible plug. Preferably, the upper end of the expansible plug 432 is permanently and nonrotatably secured to the underside of the cover plate 430, e.g. adhesively or otherwise bonded to the underside of the cover plate, so that the expansible plug does not rotate relative to the cover plate. With the nut 440 of the bolt and nut assembly 436 nonrotatably affixed to the compression plate 434, the compression plate 434 nonrotatably secured to the lower end portion 444 of the expansible plug 432, and expansible plug 432 nonrotatably affixed to the underside of the cover plate 430, these components of the core hole plug assembly 400 function as a unit so that the bolt 438 of the bolt and nut assembly 436 can be threaded into or out of the nut 440 to move the compression plate 434 relative to the cover plate 430 (toward or away from the cover plate 430).

The bolt 438 of the bolt and nut assembly 436 passes down through a hole in the cover plate, through the expansible plug 432 and is threaded into the nut 440 affixed to the compression plate 434. When the bolt and nut assembly 436 is tightened by threading the bolt 438 into the nut 440, the compression plate 434 is drawn toward the cover plate 430 to compress the expansible plug 432 between the compression plate 434 and the cover plate 430 and expand the expansible plug 432 in diameter. When the bolt and nut assembly 436 is loosened by partially unthreading the bolt 438 from the nut 440, the compression plate 434 is moved away from the cover plate 430 and permits the resilient expansible plug 432 to return to its original shape and diameter.

In use, as the expansible plug 432 is compressed by tightening the bolt and nut assembly 436 and drawing the compression plate 434 toward the cover plate 430, the expansible plug 432 expands in diameter to force the outside surface of the expansible plug 432 into contact with the sidewall of a hole. This secures the core hole plug assembly 420 in place and forms a seal between the outside surface of expansible plug 432 and the sidewall of the hole. When the bolt and nut assembly 436 is loosened and the expansible plug 432 is allowed to return to its initial shape and diameter, the outside surface of the expansible plug 432 draws away from the sidewall of the hole and the core hole plug assembly 400 can be easily removed as a unit without fear of losing a nut, compression plate, or plug down the hole or wall cavity.

The cover plate 430 and the compression plate can be made of stainless steel, aluminum, a durable polymeric material, a durable fiberglass reinforced polymeric material or some other suitable durable, preferably noncorrosive and chemical resistant material. If made of metal, the cover plate 430 can serve as the antennae for the pod 100 for carrying out wireless communication, in accordance with the present invention. The bolt and nut assembly 436 can be made with a stainless steel bolt 438 and a stainless steel nut 440. Various heads may be used on the bolt 438 of the bolt and nut assembly 436 so that the bolt and nut assembly can be tightened and loosened using a wrench, an Allen wrench, a screwdriver, or other tool. Preferably, there can be a recess in the upper surface of the cover plate 430 surrounding the hole through which the bolt passes. The head of the bolt 438 is received within the recess so that the head of the bolt is flush or substantially flush with the upper surface of the cover plate 430. In accordance with the present invention, electronics 110 circuitry (e.g., circuit boards, solar cell 140), a synchronized server 115, and batteries 130 can be designed to accept a center bolt.

The expansible plug 432 can be made of a deformable and resilient polymeric material, such as but not limited to a deformable, resilient thermoplastic rubber or polymeric material, which has the resilience to return to its original diameter and shape when the expansible plug 432 is not under compression. Preferably, the material forming the expansible plug 432 is also durable and chemical resistant. The cover plate 430 is greater in diameter than the diameter of the expansible plug 432 and any hole the core hole plug assembly 400 is to seal. The compression plate 434 is typically made of stainless steel and is a little less than but about the same diameter as the diameter of the expansible plug 432. The cover plate 430 is typically about 3½ to 4 inches in diameter. When not compressed, the expansible plug 432 is typically about ⅛ to about ¼ of an inch less in diameter than the diameter of the hole with which the core hole plug assembly 400 is to be used (e.g. about 2¾ to about 2⅞ inches in diameter for use with a hole about 3 inches in diameter) and about 1 to 1½ inches in height.

With the compression plate 434 completely embedded within the lower end portion 444 of the expansible plug 432, the polymeric material forming the expansible plug forms a lowermost disk shaped layer of the assembly. A top view of the top surface of the cover plate is shown in FIG. 7.

Figure 4:
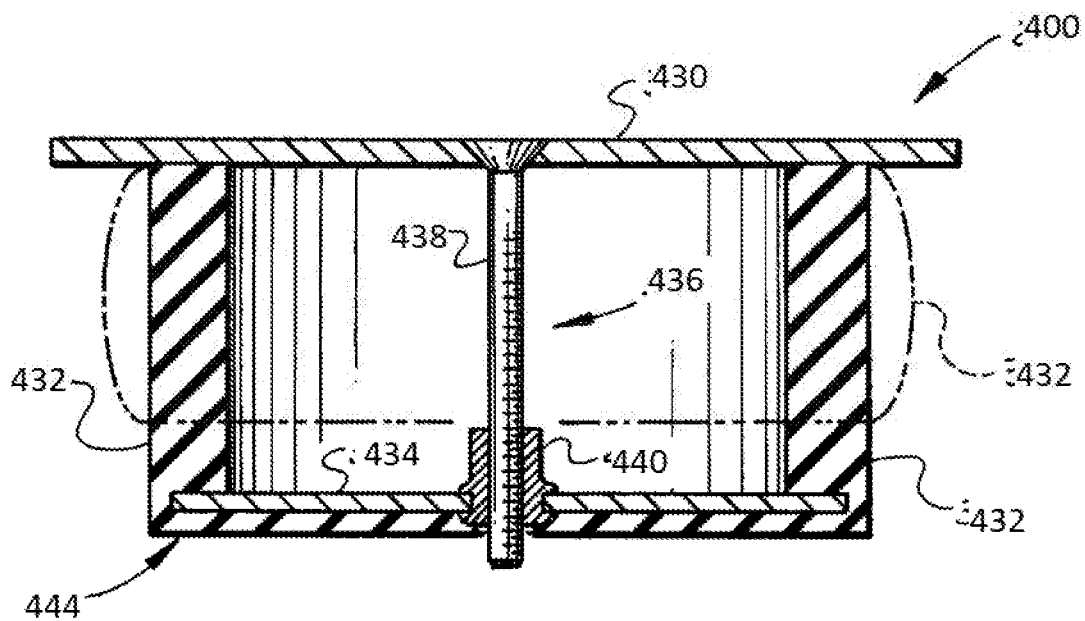
FIG. 4, labeled as prior art, illustrates a perspective view of a core hole plug assembly of the subject invention sealing a hole passing through a paving layer.
Figure 8:
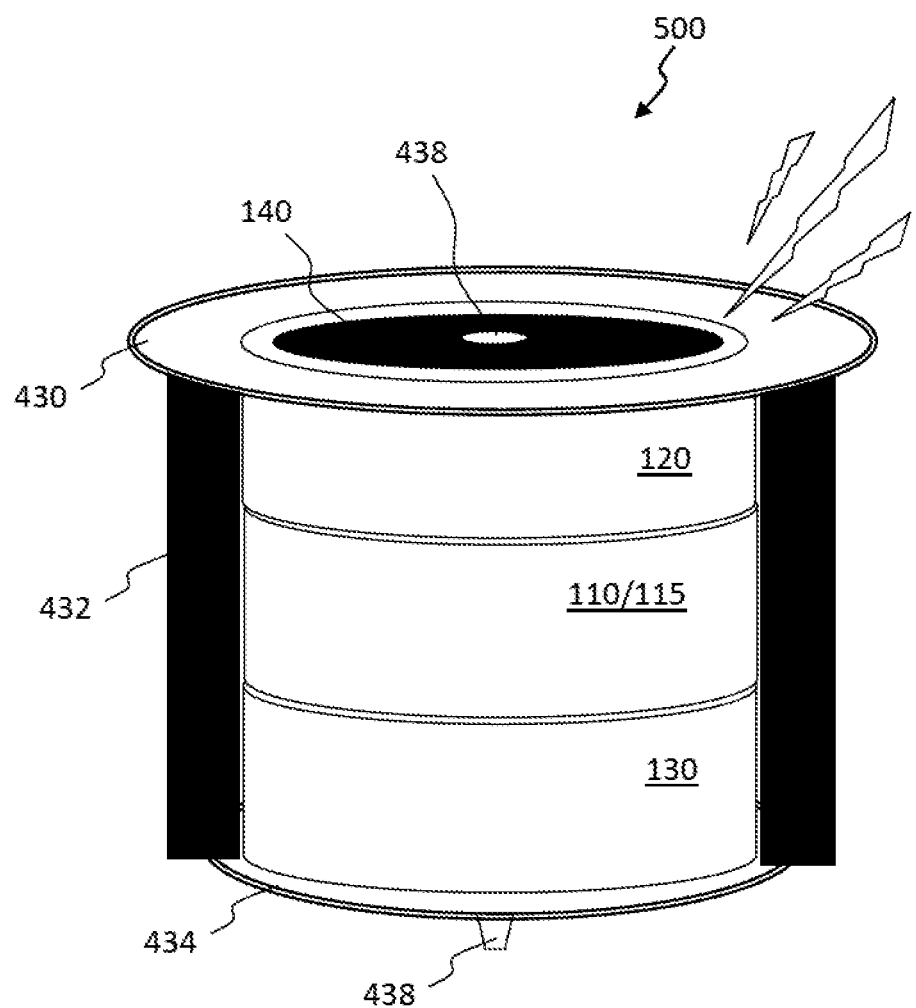
FIG. 8 illustrates a side view of the core hole plug assembly like that shown in FIGS. 4-6, however including wireless communications electronics to operate as a wireless data communications system nodes that can be distributed throughout the sports and entertainment venue for establishing a wireless communication network in communication with hand held devices used by spectator within sports and entertainment venues, in accordance with an example embodiment.

FIG. 8 illustrates a side view of a pod 500 in a form similar to the core hole plug assembly 400 shown in FIGS. 4-6; however, the pod includes wireless communications electronics 110 to operate as a wireless data communications system nodes that can be distributed throughout the sports and entertainment venue for establishing a wireless communication network in communication with hand held devices used by spectator within sports and entertainment venues, in accordance with an example embodiment. The pod 500 can also/alternatively include a synchronized server 115 to coordinate with and lessen the burden on a primary video server at the venue. The example pod 500 shown in FIG. 8 also includes a rechargeable power source 130, embedded antennae 120 and solar cell 140. Pod 500 can be embedded into surface at a sports and entertainment venue and includes modules 110-140 supporting wireless communications (e.g., WiFi access points, wireless repeaters). Electronics that are tolerant to high operating temperatures can be utilized where little or no venting is provided given the embedded nature of the core plug configuration. Venting can be provided in some installations from the bottom portion of the core hole plug.

Figure 9:
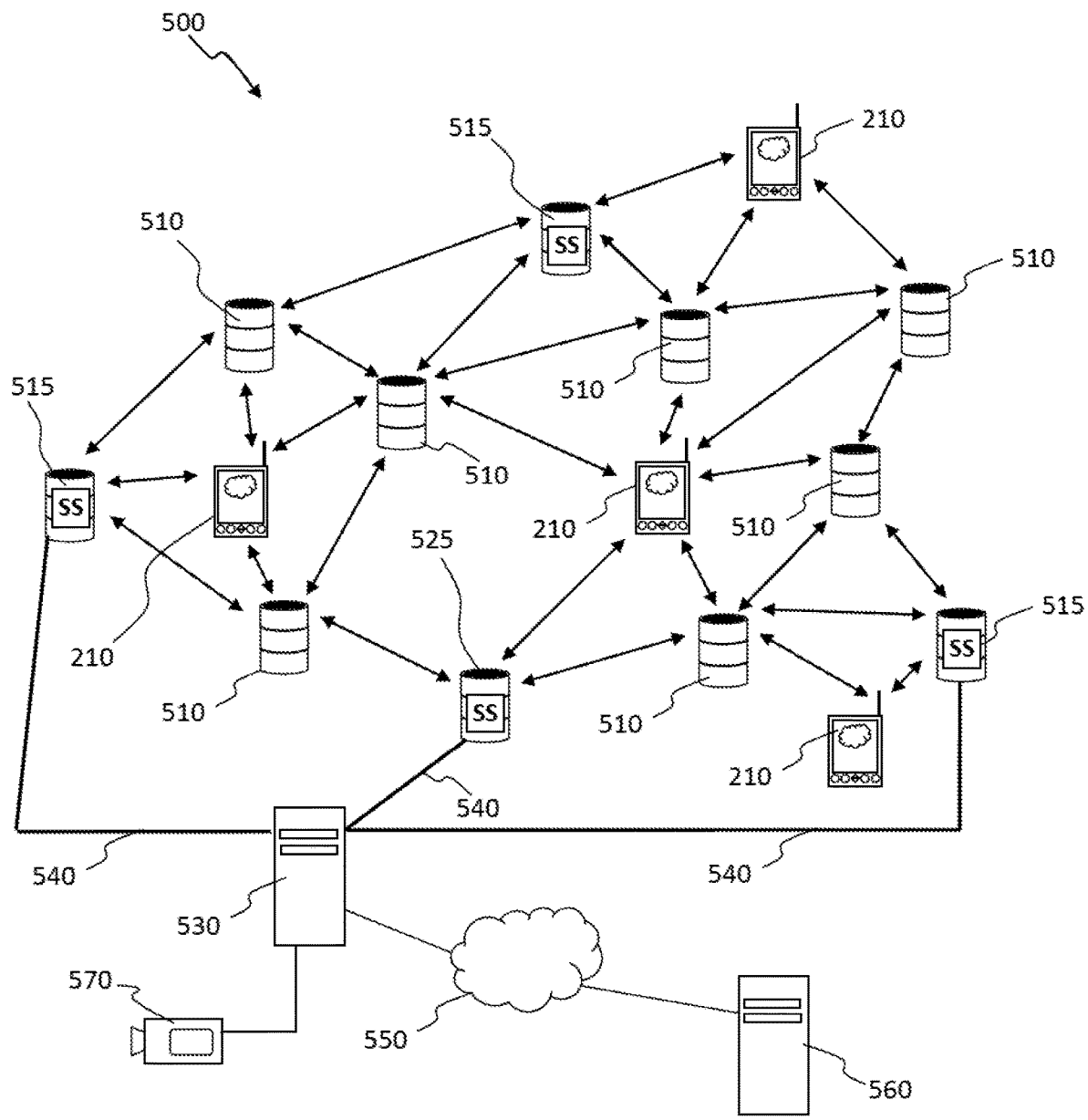
FIG. 9 illustrates a block diagram of network resources operable within sports and entertainment venue to provide wireless data communications system nodes distributed throughout the sports and entertainment venue for establishing a wireless communication network in communication with hand held devices used by spectator within sports and entertainment venues, in accordance with an example embodiment.

FIG. 9 illustrates a block diagram of network resources operable within sports and entertainment venue to provide wireless data communications system nodes distributed throughout a sports and entertainment venue 500 for establishing a wireless communication network supporting communications with hand held devices 210 used by spectator located within the sports and entertainment venue 500, in accordance with an example embodiment. Video captured by cameras 570 located throughout a sports and entertainment venue 500 is generally provided to enterprise equipment 530 located at the venue to manage recorded content such as a data server. Entertainment data including video, statistics, venue information, etc. can be provided throughout the venue to hand held device 210 via any combination of synchronized servers nodes 515 and wireless communications nodes 510 located throughout the venue. Communications nodes 510 can include wireless routers 510 connected the a wired data network 540 established at the venue as well as repeaters 520 provided throughout the venue to further extend wireless capabilities for hand held devices 210 located and in use at the venue 500. Synchronized server nodes 5151 can include a serer synchronized with a primary data server and any combination of wireless communication hardware to enable an access point for hand held devices 210 and wireless communications nodes 510 to communicate with the Synchronized server node 515. Content from remote servers 560 can also be provided to hand held devices 210 via wired and wireless data networks 550 servicing the venue.

Figure 10:
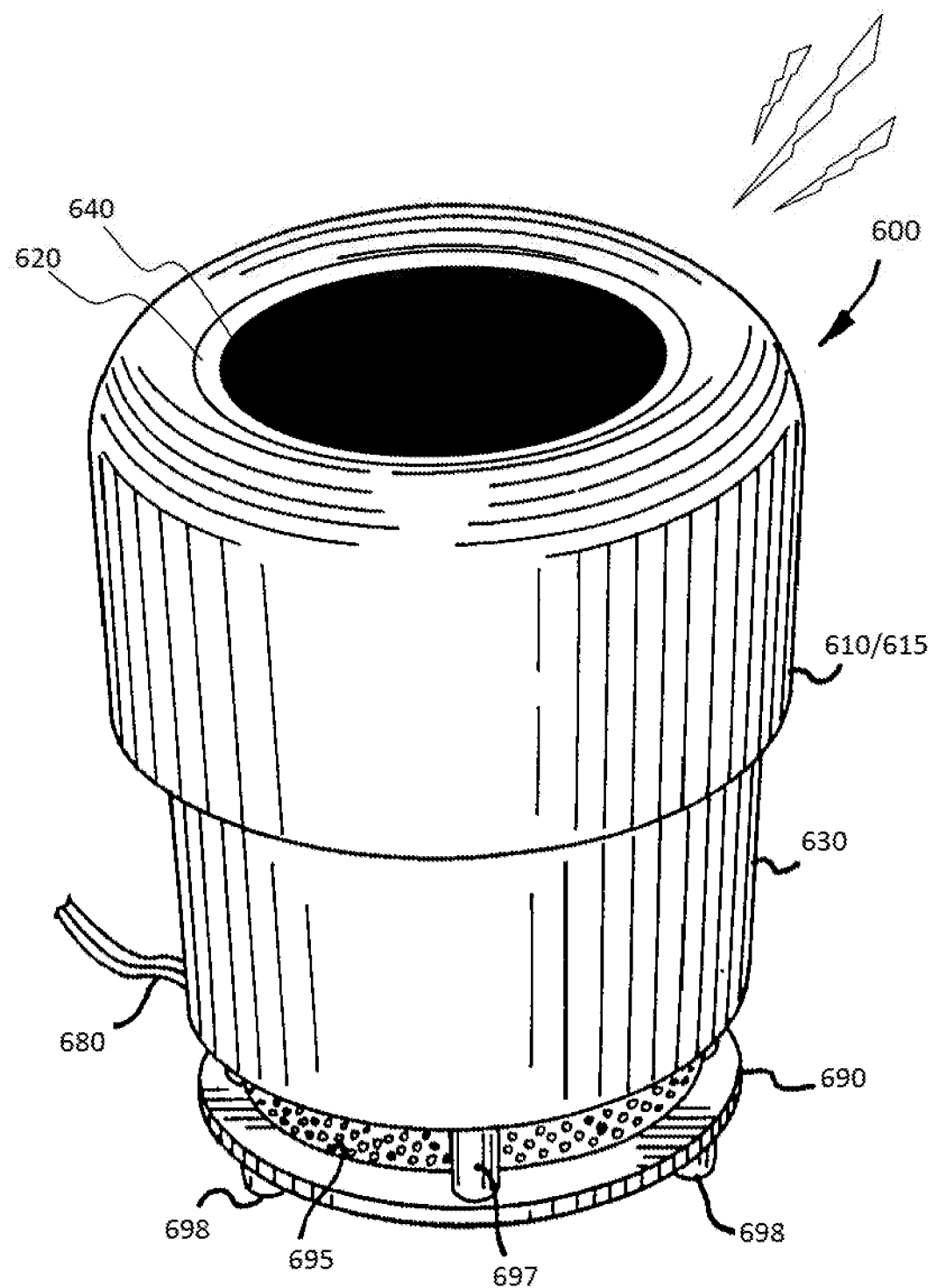
FIG. 10 illustrates just one pod housing design that can be used to carry out features of an example embodiment.

Referring to FIG. 10, a communications pod 600 including a weatherproof housing is illustrated in accordance with an example embodiment. The pod 600 includes a communications electronics portion 610, a rechargeable power source portion 630 and a base portion 690. The top surface of the communications electronics portion can include a solar cell 640, as shown. An integrated antennae ring 620 is also shown, which can facilitate communications without the need for extendable antennae hardware. If the pod 600 includes access point electronics, an Ethernet connection can be provided via a chord 680. If the pod 600 is a repeater, the Ethernet connection does not need to be provided as the repeater is facilitating communications to handheld devices from the repeaters wireless communications with Ethernet-connected access points. If the pod 600 is a synchronized data server, an Ethernet connection can be provided via chord 680. The chord 680 representing the Ethernet connection can also be representative of a power chord used to recharge the rechargeable power source (i.e., rechargeable lithium ion batteries or the like) locating within the pod 600. Batteries can be recharged in-between uses, or continuously through the chord. The chord 680 can also represent a combined power and data source for the pod 600. A vent 695 can be provided near the bottom of the housing at the base portion 690. Small spacers/pillars can provide a gap for the vent, which can enable electronics within the housing to breath/cool. Leg stands 698 can also be provided beneath the base portion 690. The housing illustrated in FIG. 10 is just one example of how pods can be presented for use in public venues. Other designs can be provided that still includes features of the present invention without departing from the scope of the present invention, which is only limited by the claim appended hereto. Materials selected for the housing should ideally withstand broad temperature ranges, ultraviolet exposure and weather.

It should be appreciated that wireless data connection are becoming more robust and provide large bandwidth capabilities. For example, Third Generation (3G) cellular communication enables access to video by handheld devices. Fourth Generation (4G) wireless data communications are already being deployed. Given the teaching herein, nodes 600 operating as a synchronized server pod 515 throughout a public venue can be synchronized with a primary server using cellular 4G, or greater, wireless communications. As the synchronized servers are being synchronized with near real time video data for a live event, the synchronized servers 515 can distribute near real time video and data content to hand held devices utilizing supporting communications pods 510. Infrastructure costs and maintenance requirements can thus be greatly reduced with a system as described herein; especially when deployment is temporary.

In describing the invention, certain embodiments have been used to illustrate the invention, and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A system supporting the communications of video and data to hand held wireless devices located within a venue, comprising:
    at least one data server operating as a master server in managing video of various perspectives of an activity captured by a plurality of video cameras located in a venue;
    at least one pod among a plurality of pods, wherein the at least one pod includes a synchronized server, wireless communications electronics and an integrated antennae deployed as at least one communications node in the venue and providing data including the video from the at least one data server to supporting the at least one communications node and hand held wireless devices in use by spectators located within a wireless range of the at least one pod and the at least one communications node;
    wherein the at least one data server is in communication with synchronized servers operating as slave servers that are subordinate to the at least one data server operating as the master server while the synchronized servers are distributed throughout the venue within the at least one pod and operable to replicate data managed and transmittable by the at least one data server, and wherein the at least one pod is deployed in a distributed network of self-contained communications nodes throughout spectator occupied areas of the venue to provide data including the video from the at least one data server through the synchronized servers to at least one hand held wireless device among the hand held wireless devices in use by at least one of the spectators located within a wireless communication range of the at least one pod.

2. The system of claim 1, wherein the at least one pod further comprises a rechargeable power source sustaining self-contained operation of the wireless communication electronics.

3. The system of claim 2, wherein the at least one pod further comprises a solar cell providing electrical power to charge the rechargeable power source.

4. The system of claim 3, wherein the at least one pod is embedded in a wall or a floor surface of the venue.

5. The system of claim 1, wherein the at least one pod further comprises a core hole plug including the wireless communications electronics held therein, wherein the at least one pod is embedded in a wall of the venue.

6. The system of claim 1, wherein the at least one pod further comprises a core hole plug including the wireless communications electronics held therein, wherein the at least one pod is embedded in a floor surface of the venue.

7. The system of claim 1 wherein at least one self-contained communications node among the self-contained communications nodes comprises a wireless access point.

8. The system of claim 1 wherein at least one self-contained communications node among the self-contained communications nodes comprises a wireless repeater.

9. The system of claim 1 wherein the at least one pod comprises a core hole plug assembly.

10. The system of claim 9 wherein the core hole plug assembly comprises a compression plate and a cover plate.

11. The system of claim 9, wherein the at least one pod is embedded in a wall or a floor surface of the venue.

12. The system of claim 1, wherein the hand held wireless devices comprise at least one smartphone.

13. A system supporting the communications of video and data to hand held wireless devices located within a venue, comprising:
at least one data server operating as a master server in managing video of various perspectives of an activity captured by a plurality of video cameras located in a venue;
at least two pods among a plurality of pods, wherein each of the at least two pods includes a synchronized server, wireless communications electronics and an integrated antennae deployed as communications nodes in the venue and providing data including the video from the at least one data server to supporting the communications node and hand held wireless devices in use by spectators located within a wireless range of the at least two pods and the communications nodes;
wherein the at least one data server is in communication with synchronized servers operating as slave servers that are subordinate to the at least one data server operating as the master server while the synchronized servers are distributed throughout the venue within the at least two pods and are operable to replicate data managed and transmittable by the at least one data server, and wherein the at least two pods are deployed in a distributed network of self-contained communications nodes throughout spectator occupied areas of the venue to provide data including the video from the at least one data server through the synchronized servers to hand held wireless devices in use by spectators located within a wireless communication range of the at least one two pods.

14. The system of claim 13, wherein the each of the least two pods comprises a rechargeable power source sustaining self-contained operation of the wireless communication electronics.

15. The system of claim 14, wherein the each of the least two pods comprises a solar cell providing electrical power to charge the rechargeable power source.

16. The system of claim 13, wherein the each of the least two pods comprises is embedded in a wall or a floor surface of the venue.

17. The system of claim 13, wherein the each of the least two pods comprises a core hole plug including the wireless communications electronics held therein, wherein the at least one pod is embedded in a wall of the venue.

18. The system of claim 13, wherein the each of the least two pods comprises a core hole plug including the wireless communications electronics held therein, wherein the at least one pod is embedded in a floor surface of the venue.

19. The system of claim 13 wherein at least one self-contained communications node among the self-contained communications nodes comprises a wireless access point.

20. The system of claim 19 wherein at least one self-contained communications node among the self-contained communications nodes comprises a wireless repeater.

21. A method of supporting the communications of video and data to hand held wireless devices located within a venue, comprising:
operating at least one data server as a master server in managing video of various perspectives of an activity captured by a plurality of video cameras located in a venue;
providing at least one pod among a plurality of pods, wherein the at least one pod includes a synchronized server, wireless communications electronics and an integrated antennae deployed as at least one communications node in the venue and providing data including the video from the at least one data server to supporting the at least one communications node and hand held wireless devices in use by spectators located within a wireless range of the at least one pod and the at least one communications node;
establishing a communication between the at least one data server is and the synchronized servers operating as slave servers that are subordinate to the at least one data server operating as the master server while the synchronized servers are distributed throughout the venue within the at least one pod and operable to replicate data managed and transmittable by the at least one data server, and wherein the at least one pod is deployed in a distributed network of self-contained communications nodes throughout spectator occupied areas of the venue to provide data including the video from the at least one data server through the synchronized servers to at least one hand held wireless device among the hand held wireless devices in use by at least one of the spectators located within a wireless communication range of the at least one pod.

* * * * *